Dec. 13, 1960           I. CHIVARI           2,964,150
CHANGE SPEED GEAR AUTOMATIC CONTROL
Filed Oct. 15, 1957           6 Sheets-Sheet 1
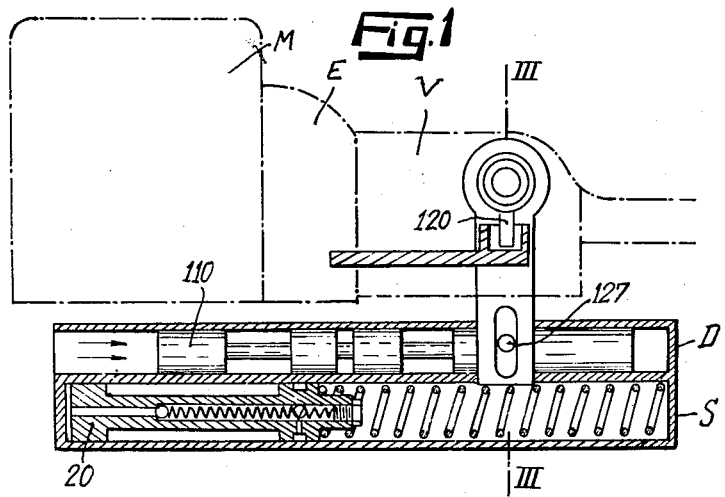
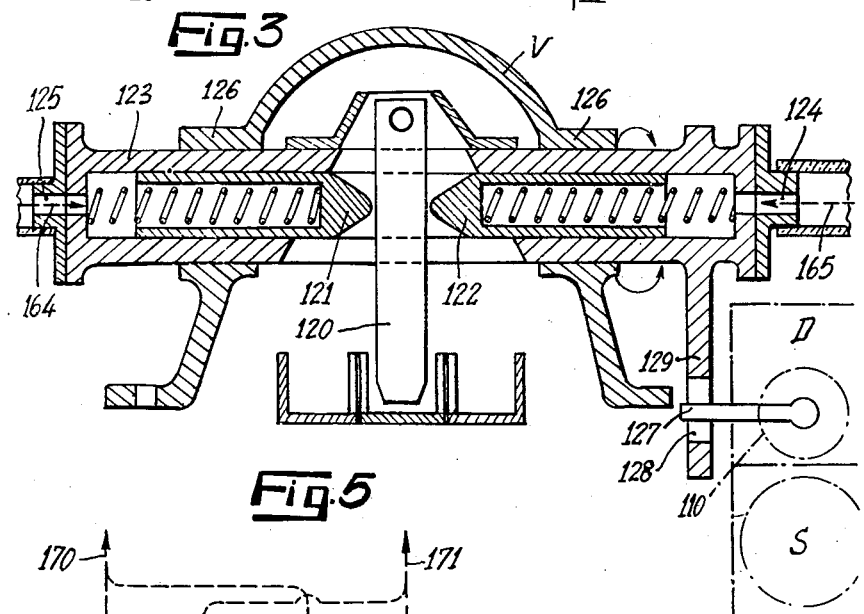
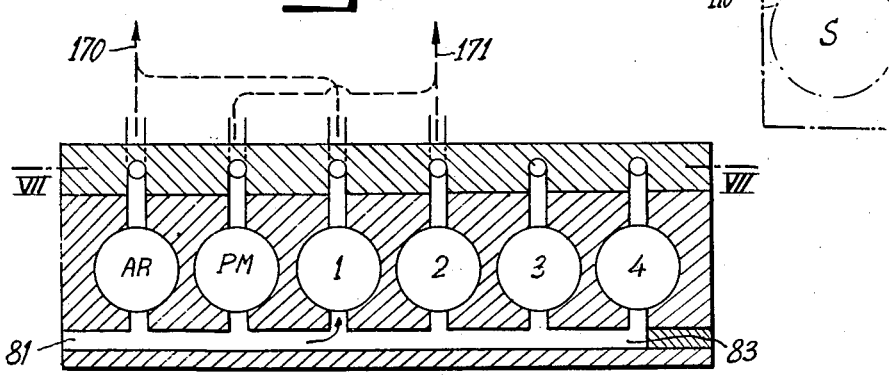

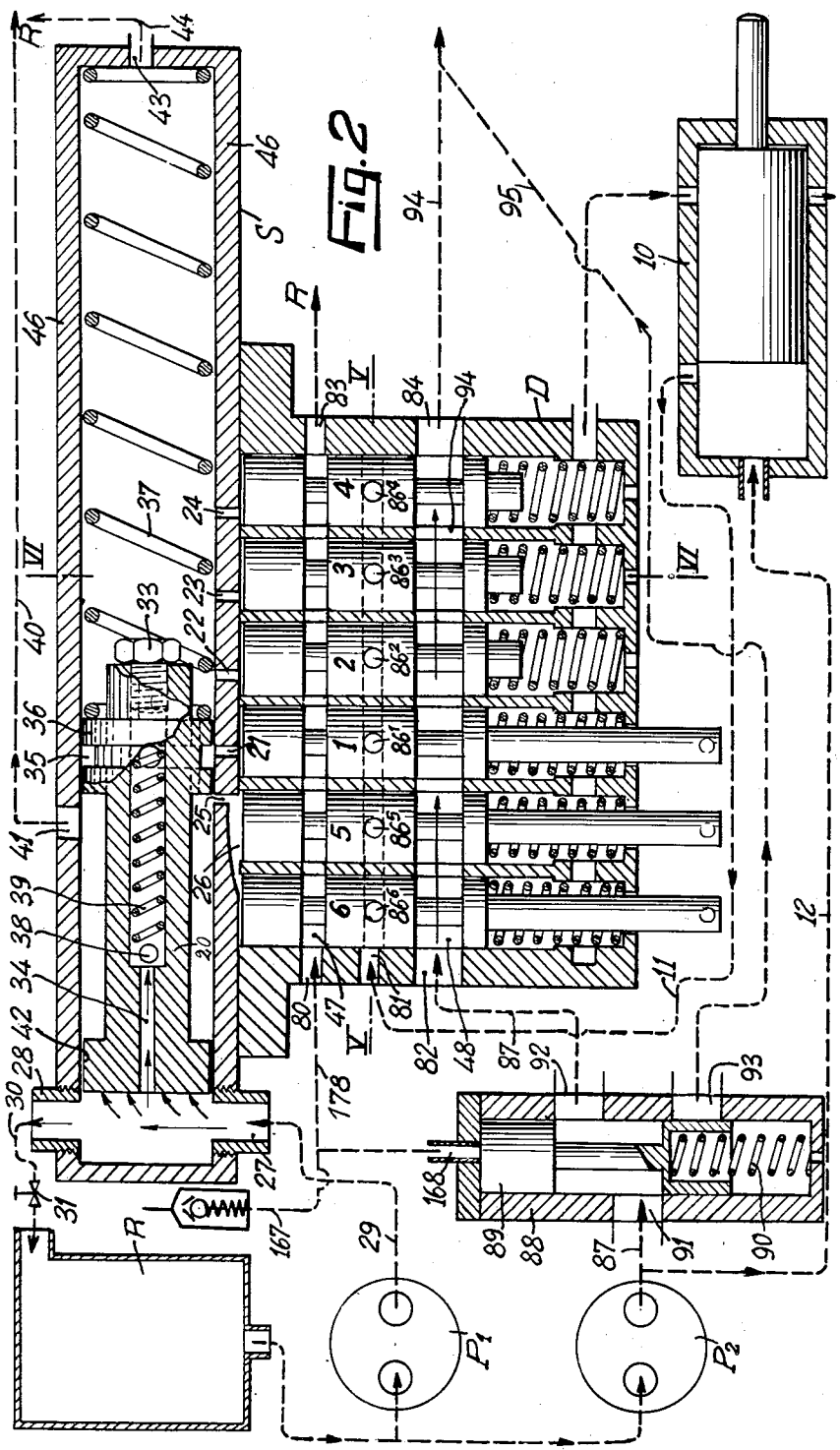

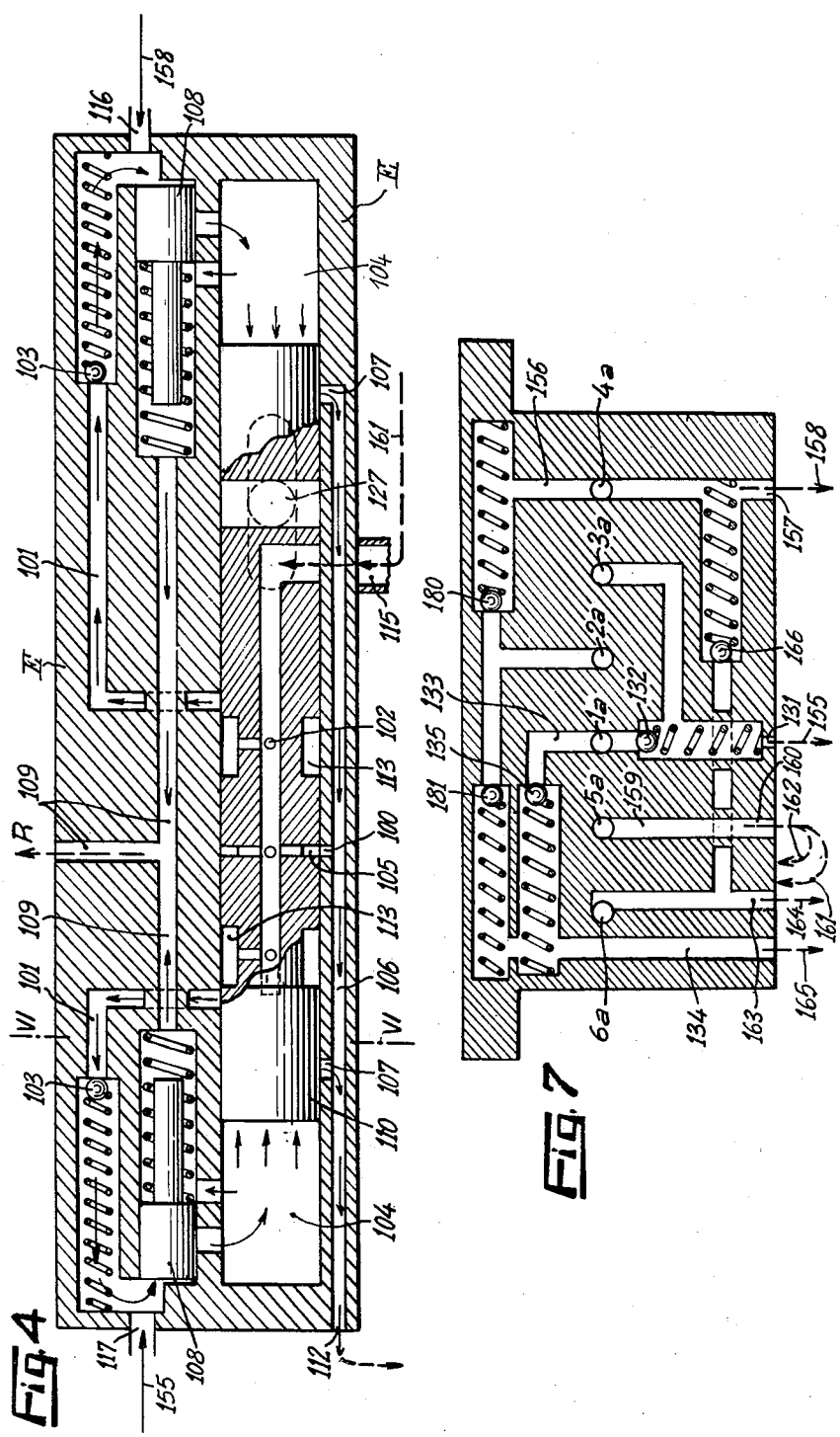

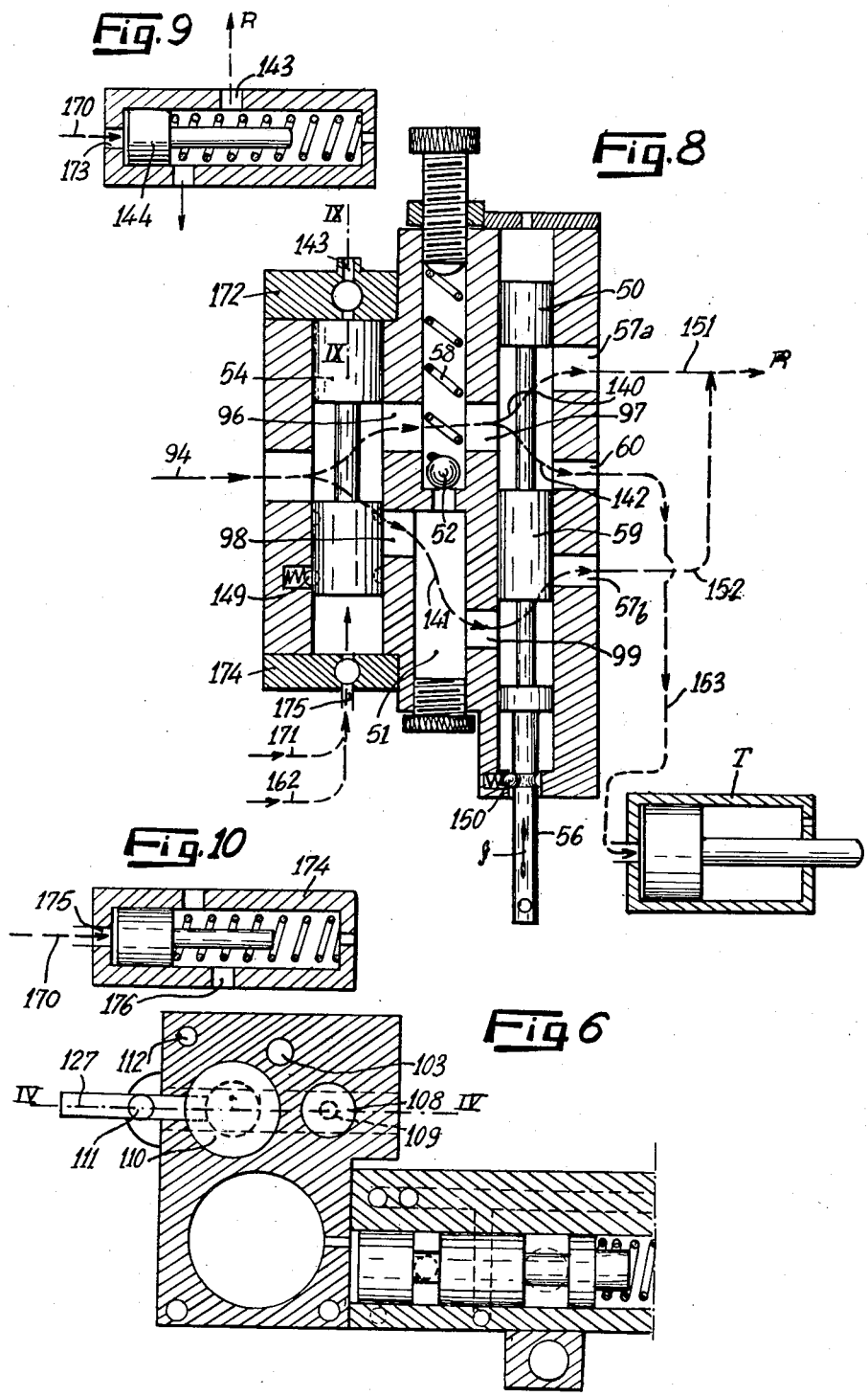

Dec. 13, 1960            I. CHIVARI            2,964,150

CHANGE SPEED GEAR AUTOMATIC CONTROL

Filed Oct. 15, 1957            6 Sheets-Sheet 5

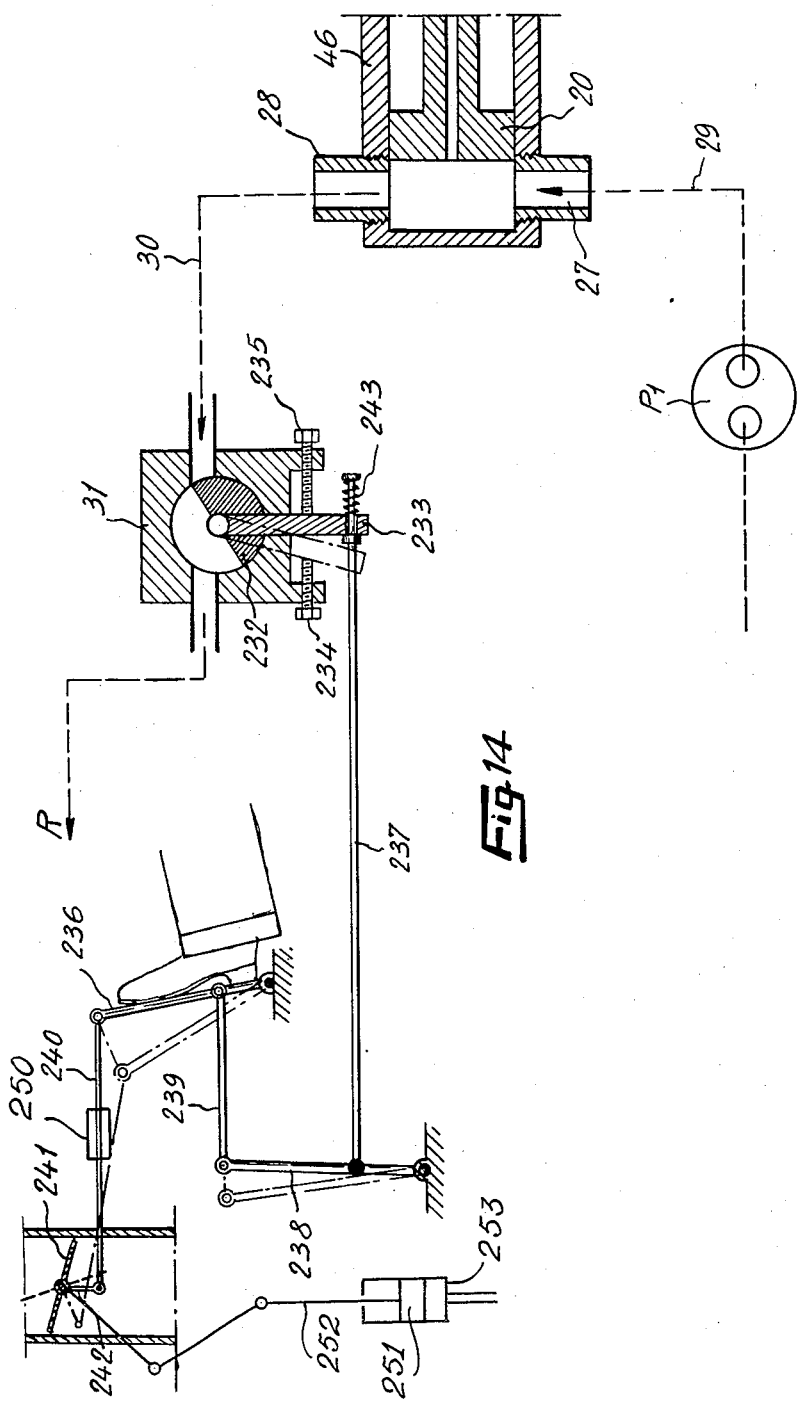

United States Patent Office 2,964,150
Patented Dec. 13, 1960

2,964,150

CHANGE SPEED GEAR AUTOMATIC CONTROL

Ilie Chivari, 26ter Rue Traversiere, Paris, France, assignor of one-third to Paul Nouel, Paris, France Filed Oct. 15, 1957, Ser. No. 690,267

Claims priority, application France Oct. 16, 1956

14 Claims. (Cl. 192—3.5)

The present invention relates to an automatic hydraulic control device for a vehicle change speed gear.

The device according to the invention is to be used with conventional mechanical gear boxes or the like and so to speak replaces the driver of the vehicle for automatically shifting successively from a gear to another as the vehicle reaches the critical gear changing speeds.

According to the invention, the gear changing automatic control device comprises, in combination:

(a) Multiple-action hydraulic motor means, hereafter called distributor, adapted to actuate the mechanical control means of the gear box;

(b) A first pump driven from the output shaft of the gear box and consequently delivering a supply of liquid at a rate depending on the speed of said output shaft, the liquid thus delivered being fed back to the storage tank from which it is supplied through a restrictor causing a variable back pressure which is a function of the rate of flow and thus of the output shaft speed;

(c) A hydraulic selector subjected to the action of said variable back pressure and controlling the action of said hydraulic motor means on the gear box operating means;

(d) A second pump supplying pressure liquid to said hydraulic motor means and driven by the engine with which is associated the gear box, the rate of delivery of said second pump being independent of the speed of the gear box output shaft.

According to an embodiment of the invention, the pressure liquid supplied by said second pump feeds two circuits:

One of said two circuits, hereinafter called the "main circuit," has connected therein a series of valve slides, or like means, the whole of which constitute the distributor unit, the movements of said slides, controlled by the selector, causing the circuit to be closed and thus giving rise to a pressure sufficient for releasing the clutch as required for gear changing.

The other circuit, hereinafter called the "secondary circuit," is independent from the slide system controlled by the selector and serves to release the clutch when the vehicle is rest, whatever be the position of the slides of the distributor unit, and, in particular embodiments of the invention, serves to automatically cause brake operation when the vehicle driver releases the accelerator pedal to a sufficient extent.

According to a feature of an embodiment of the invention, the speed selecting valve slides control the supply of pressure fluid delivered by said first pump to either one of a plurality of cylinders constituting the distributor unit, each of said cylinders containing a slide piston adapted to open or close the main pressure liquid circuit; whenever this circuit is closed by any one of said slide pistons, the clutch is released as required for the corresponding gear changing.

The distributor unit comprises a pipe system extending from the cylinders of said unit and connected on the one hand with slidable pusher pistons for effecting a part of the movements of the gear box operating pin and, on the other hand, with the input of a device for controlling the rotary movements of the support of said pin about the axis of the sliding movement of said pusher pistons.

The automatic speed changing is made by control means actuating the gear box operating pin; according to an embodiment of the invention, said control means comprise a cylinder rotatively mounted in the gear box casing and pistons reciprocating in said cylinders.

The restrictor connected in the ducting returning to the liquid storage tank may have a fixed cross-sectional area; alternatively, for some applications, it may have a variable area depending on a factor other than the output shaft speed; for example, it may be operated through a mechanical linkage from the accelerator pedal.

In order to avoid jerks if the pressure supplied by the second pump is abruptly released, there may be connected in the co-called "secondary circuit," upstream of the servomotor controlling the clutch, an automatic valve adapted to open widely for the inlet into said servomotor and provided with a restricted duct permanently open for the back flow of the liquid.

In an alternative embodiment, the speed selecting device is combined with a centrifugal clutch automatically released when the engine rotates at speeds lower than a predetermined value.

For a better understanding of the invention, embodiments thereof will now be described more fully by way of examples with reference to the accompanying drawings, in which:

Fig. 1 is a general diagrammatical view at a small scale showing how are arranged the main members of the control device with respect to the vehicle engine;

Fig. 2 is a diagrammatical horizontal section of a speed selecting unit associated with a pressure fluid distributing unit;

Fig. 3 is a diagrammatical vertical section, on the line III—III of Fig. 1, of the gear box operating device;

Fig. 4 is a diagrammatical section on the line IV—IV of Fig. 3 showing the rotational movements of the gear box operating device;

Fig. 5 is a vertical section on the line V—V of Fig. 2;

Fig. 6 is a corresponding diagrammatical section on the line VI—VI of Figs. 2 and 4;

Fig. 7 is a section on the line VII—VII of Fig. 5 showing the arrangement of the circuits in the distributor unit;

Fig. 8 is a view showing the automatic clutch release and brake control device;

Fig. 9 is a partial section on the line IX—IX of Fig. 8, at a greater scale;

Fig. 10 is a partial section similar to Fig. 9 at the opposite side of Fig. 8;

Fig. 14 is a diagrammatical view of a linkage system for operating the throttle means.

Figure 11:
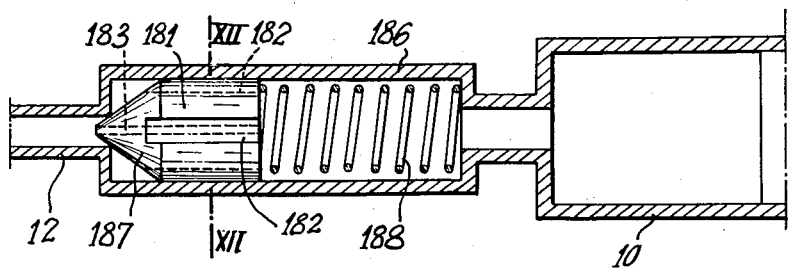
Fig. 11 is a section showing an embodiment of the low speed clutch release control.

For the sake of clarity, the pipings are only indicated by dotted lines in the drawings.

In the illustrated embodiment, the device according to the invention comprises, mounted on the unit consisting of the engine proper M (Fig. 1), the clutch E and the gear box V, an apparatus for actuating the gear box operating pin 120. Said apparatus, as is clearly shown in Fig. 3, comprises, for giving the pin 10 all the required movements, pistons 121, 122 urged towards each other by springs and slidably mounted in a sleeve 123 so as to be movable axially in said sleeve under the action of a pressure fed through either of the orifices 124, 125, the sleeve 123 being journalled for rotation about its own axis in bearings 126 provided in the casing of the gearbox V; the rotation of said sleeve is brought about by a dog 127 carried by a piston 110 and adapted to slide in a slot 128 formed in a lever 129 integral with the sleeve 123. The sliding and rotational movements just referred to are automatically controlled in the way which will be described below.

This automatic control is provided by the combination of an automatic speed selector S, operated by the pressure supplied from a volumetric liquid pump $P_1$ driven from the output shaft—for example the output shaft of the gear box—said selector being associated with a slide valve distributor D which, through a number of pipe circuits and auxiliary distributing means, is operated by a second pump $P_2$ driven by the engine to release the clutch and shift from a gear to another.

The speed selector comprises a cylinder 46 wherein operates a slide piston 20. At one end, said cylinder is fed through a port 27 with pressure liquid delivered through the duct 29 by the pump $P_1$ driven from the output shaft. To a port 28 of the same cylinder end is connected a duct 30 leading to the liquid storage tank R open to atmosphere; in this duct 30 is connected a restrictor, which may be an adjustable throttle 31. It will be appreciated that, when the throttle 31 has been adjusted to a suitable position, as will be specified hereafter, the pressure in the cylinder chamber between 27 and 30, which pressure acts on the selector slide piston 20, varies according to the speed of rotation of the pump, which is in turn a function of the vehicle velocity.

The slide 20 of the selector S, loaded by a spring 37, is formed with an inner bore 34 closed at its end, for example by a screw-plug 33, and connected through appropriate radial holes with an annular groove 35 formed in its sliding surface 36. Said groove 35 comes successively in register, when the slide moves from the left to the right (as seen in Fig. 2) as the pressure increases, with ports 21, 22, 23, 24 provided in the wall of the cylinder 46 and corresponding each respectively to one of the gear speeds. The bore 34 of the slide is provided with a suitable automatic valve, such as a spring-loaded ball 38.

For avoiding that after shifting into the fourth gear the pressure may become excessive, there is provided in the wall of the cylinder 46 a discharge orifice 41 which is open when the slide is in the extreme right position and thus its sliding surface 42 has moved beyond said orifice 41. The orifice 41 is connected through a duct 40 to the storage tank R open to atmosphere. Moreover, the cylinder 46 has formed in its right end wall a discharge orifice 43 also connected to the tank R through a duct 44.

The wall of the cylinder 46 is formed in addition with a port 25 corresponding to the neutral gear and with a groove 26 extending from the port 25 and corresponding to the reverse gear.

The distributor D comprises a series of juxtaposed cylinders the ends of which register respectively with the ports 21 to 26 of the selector cylinder 46. In each distributor cylinder operates a spring-loaded slide piston 1 to 6. Each of said pistons 1 to 6 is formed with a first annular groove 47 and a wider annular groove 48. The groove 47 may, according to the position of the piston, register either with orifices 80 and 83 formed in the distributor walls, thus establishing a free communication between said two ports (one of which 83 is connected to the tank R) or with other orifices 81 and $86^1$ to $86^6$ which correspond with the gear box operating means. The groove 48 registers, when the slide pistons are in the unoperated position, with the inlet port 82. Said grooves 48, together with the connecting holes 94 between the distributor cylinders, constitute a circuit, hereafter called the "main circuit," which is connected to the pump $P_2$ through a piping 87 in which is mounted a slide valve 88 which has a function for automatically engaging the clutch after a shifting of the gear, as will be explained below.

Moreover, the distributor orifice 80 registers, in the unoperated position of the pistons 1 to 6, with the grooves 47 thereof and is connected through a duct 178 to the inlet orifice 168 of the valve 88; as already mentioned, the distributor orifice 83, at the same level as the orifice 80, is connected to the tank R.

The valve 88 associated with the distributor D has a slide piston 89 loaded by a spring 90. Said valve is formed with an inlet orifice 91 and two outlet orifices 92, 93, of which the orifice 92 is connected to the inlet port 82 of the distributor (main circuit) and the orifice 93 leads, through a ducting 95 which will hereafter be called the "secondary circuit," to a special apparatus, to be described below, for releasing the clutch when the vehicle is stopped and for braking.

The clutch is released by means of servomotor means 10 of conventional design operated by a pressure fed through the duct 12 from the pump $P_2$ when the duct 11 which connects the servomotor to the distributor is closed; the piston of said servomotor 10 is loaded by the powerful clutch springs which re-engage the clutch as soon as the pressure has dropped.

The ductings extending from the distributor D consist of a number of ducts formed in a plate member shown in Fig. 7, some of said ducts being provided with valve means, consisting in the illustrated example of spring-loaded balls. Said plate member, which serves as a cover plate for the distributor D, is formed with a number of vertical holes $1a$ to $6a$ registering with the orifices $86^1$ to $86^6$, respectively, of the distributor slide pistons.

From the hole $1a$ corresponding to the first gear slide piston extends a duct 131 wherein is interposed a spring-loaded ball 132, and a duct 133 which opens at 134 into a duct 165 connected to the orifice 124 to control the movement of translation of the gear box operating pin 120. In said duct 133 is provided a spring-loaded valve ball 135. The duct 131 is connected through a duct 155 to the orifice 117 of the apparatus controlling the rotation of the gear box operating pin 120 (Fig. 4) (1st and 3rd) gears, and the orifice 134 is connected to the duct 124 for controlling the movement of translation of said pin 120 (1st and 2nd gears).

The hole $2a$ is connected, on the one hand, through a duct 156 also connected to the hole $4a$ (with the interposition of a valve) to the orifice 116 of the apparatus which controls the rotation of the gear box operating pin 120 (Fig. 4) (2d, 4th and reverse gears) and, on the other hand, to the same orifice 134 as the hole $1a$. The hole $3a$ is connected to the duct 131, as the hole $1a$, and is thus connected through the duct 155 to the orifice 117 of the apparatus which controls the rotation of the gear box operating pin 120. The hole $4a$ is connected to the same orifice 157 as the hole $2a$. The hole $5a$, corresponding to neutral, is connected through a duct 159 to the orifice 160 which communicates, on the one hand, through a duct 161 with the apparatus controlling the rotation of the gear box operating pin 120 and, on the other hand, through a duct 162 with the clutch release and brake control apparatus illustrated in Fig. 8. Lastly, the hole $6a$, which corresponds to the reverse gear, communicates, on the one hand, with an orifice 163 connected through the duct 164 to the orifice 125 for controlling the movement of translation of the gear box operating pin 120 and, on the other hand, through a valve 166 to the orifice 150 which, through the duct 158, is connected to the apparatus for controlling the rotation of the gear box operating pin 120.

As shown in Fig. 3, the movement of translation of the pin 120 is effected by the pistons 121, 122 sliding in the sleeve 123, under the action of a pressure fed either through the orifice 125 to which are connected the duct 164 and the hole 6a (reverse gear) or through the orifice 124 to which are connected the duct 165 and the hole 1a or 2a (1st and 2d gears). The rotation of the pin 120 is effected by causing the sleeve 123 to swing about its own axis by means of the lever arm 129 actuated by the dog 127 secured to the slide piston 110 of the apparatus E which controls said rotation and which is illustrated in Fig. 4 and will be described presently.

The control apparatus E, which is mounted above the selector S, as shown diagrammatically by the chain lines in Fig. 1, comprises a slide piston 110 formed with a radial bore adapted to receive through the inlet orifice 115 pressure fluid fed through the duct 161. Said slide piston may be moved within its cylinder by a pressure fed to one of its end spaces 104 either through the orifice 116 to which is connected the duct 158 (corresponding to 2d, 4th and reverse gears) or through the orifice 117 to which is connected the duct 155 (corresponding to 1st and 3rd gears). The slide piston 110 carries the dog 127 the movement of which causes the sleeve 123 to swing (Figs. 1 and 3). On the dog 127 is secured a guide rod 111 (Fig. 6) parallel to the axis of the piston 110 and moving in slideways for avoiding lateral loads on the piston 110. This apparatus is also provided with a duct 106 wherein open the orifices 107 uncovered at the end of the stroke of the piston 110 in either direction and which extends to the orifice 112 connected by a piping 167 to the orifice 168 in the bottom of the valve 88 through an automatic valve (Fig. 2).

The apparatus E comprises also auxiliary slide pistons 108 for feeding and exhausting pressure liquid into and from the cylinder chamber 104. Moreover, this apparatus comprises ducts 101 wherein are interposed valves 103 and with which may come in register annular recesses 113 formed in the piston 110 and fed through radial bores 102 in said piston, thus connecting, through the piston 110, the inlet orifice 115 to one of the orifices 116, 117 when said piston moves from its middle position shown in Fig. 4. Lastly, the apparatus E has formed in its wall an orifice 100 registering with an annular groove of the piston 110 when the latter is in its middle position.

In Fig. 8 is illustrated an apparatus for releasing the clutch when the vehicle is stopped—for example when the engine is idling—and for braking. It comprises, within a body of suitable shape, two slide pistons 54, 59, the latter being operatively connected to the accelerator pedal, the rod of which is diagrammatically shown at 56. The return spring of said pedal, which acts in the direction opposite to the arrow f, is not shown for simplifying the drawing.

Between the two cylinders wherein said pistons 54, 59 operate is formed an intermediate bore 51 divided at the middle by a valve ball 52 loaded by a spring 58. The upper portion of said bore communicates with said two cylinders respectively through ports 96, 97, and its lower portion through ports 98, 99. The body of the apparatus is moreover formed with two outlet orifices 57a, 57b, connected through ducts 151 and 152 to the storage tank R, and an orifice 60 connected through a duct 153 to the braking system T diagrammatically shown.

Thus are formed two circuits 140, 141, for releasing the clutch in certain conditions and a third circuit 142 for braking according to the release of the accelerator pedal.

Moreover, the end of the cylinder of the piston 54 is closed by an admission and exhaust block 172 containing a slide piston 144 and formed with an inlet orifice 173 (Fig. 9) fed through the ducts 170 from the holes 1a and 6a, and with an outlet orifice 143 connected to the tank R; this orifice 143 is closed by the piston 144 (which is loaded by a spring 145) when its face is subjected to the liquid pressure, which occurs in the first or reverse gear.

The opposite end of the same cylinder is closed by a similar block 174 (Fig. 10) formed with an inlet orifice 175, fed through the ducts 171 from the holes 5a and 2a, and with an outlet orifice 176.

Lastly, the slide pistons (or the piston rod) may be provided with devices for maintaining them in particular positions, such as the spring-loaded ball-latches 149, 150.

The automatic change speed control apparatus described above operates as follows:

1. Engine starting

Let it be assumed first that the driver has stopped the vehicle, without pulling the neutral control lever. In such conditions, all the slides 1 to 6 of the distributor D have resumed the unoperated position shown in Fig. 2 and the slide 89 is in the uppermost position, so that the main circuit $P_2$, 87, 94 is open. The piston 110 of the apparatus E is in its extreme right position.

At this time, as the accelerator pedal is not depressed (as shown in Fig. 8), the orifice 57b is closed by the piston 59. The piston 54 is however in its lowermost position where it has been placed, as will be described below, when the first gear has been engaged; it therefore closes the port 96. Pressure is thus developed within the chamber 51 up to a value sufficient to lift the valve ball 52. Meantime, the clutch has been released by the pressure in the ducts 94, 87 and 12, and remains in this condition as long as no other manoeuvre is effected, the engine being idling.

If, at this time, the neutral gear control lever or other control member is actuated to move the slide piston 5, a circuit is opened as follows: duct 12, servomotor 10, duct 11, orifice 81, hole 5a, duct 161, orifices 115—102—101, right hand valve 103, space 104 (the pressure having moved the piston 108 towards the left); as a result, the slide piston 110 of the apparatus E is moved towards the left to its middle position, and consequently the gear box operating pin 120 is put in the neutral position. The groove 105 is then in register with the orifice 106 and pressure is fed through the orifice 112 and the duct 167 to the valve 88 the piston of which is thus moved downwards to close the main circuit 87—94 (Fig. 2). However, at the same time, pressure fed through the hole 5a, the orifice 160, the duct 171 and the orifice 175 has caused the piston 54 to move to its upper position, thus opening the circuit 140—151 towards the storage tank. The pressure drops, but the pin 120 remains in the neutral position.

If at this time it is desired to put the vehicle in the forward motion condition, the lever operating the slide piston 1 is actuated (see Fig. 2). This operation causes the closure of the orifices in the main circuit 94, so that the pressure rises in the ducts 87 and 12 and the clutch is released. At the same time, pressure is developed in the duct 11, and transmitted on to the hole 1a (Fig. 7) since the groove 47 is at the level of the inlet orifice 81, and therefrom, through the duct 165 to the orifice 124 (Fig. 3) and through the duct 155 to the orifice 117 (Fig. 4); thus are produced both the movements of translation and of rotation which bring the operating pin 120 to the position corresponding to the first gear, which is therefore engaged. In the above operation, the piston 110 (Fig. 4) has been moved to the right; therefore, pressure has been fed through the orifices 107, 112 and the duct 167 to the valve 88 to cause the piston 89 thereof to move downwards to close the main circuit 94 and open the secondary circuit 95. The pressure is thus maintained in the servo-motor through the duct 12, so that the clutch remains released.

However, the pressure fed at the same time to the orifice 170 (Fig. 8) has caused the piston 54 to move downwards, thus closing the port 96 and opening the port 98.

The slide piston 59 connected to the accelerator pedal is in the position shown in Fig. 8, thus leaving the circuits 140, 142 open, but closing the orifice 57, so that the circuit 141 is cut and under a pressure limited by the valve ball 52 to the value required for releasing the clutch. Just after this operation, the control lever having been released, the groove 47 has returned into register with the ports 80, 83 so that the pressure has dropped within the duct 178 and the piston 89 has moved back to its upper position.

The engine runs on in the idling condition, the clutch being released, the first gear engaged and the vehicle still at rest.

2. Vehicle starting

The vehicle is started by merely depressing the accelerator pedal.

As the engine speeds up, the pressure in the secondary circuit 95 rises. The piston 54 being in the lower position, the pressure rises in the chamber 51, but, since the ball 52 is kept against its seat by the spring 58, the clutch remains at first released. When however the accelerator pedal has been sufficiently depressed for the piston 59 beginning to uncover the orifice 57b connected to the storage tank by the duct 152, the pressure drops and the clutch is engaged by the action of its springs.

Since the piston 89 is in its upper position, pressure prevails again in the duct 87.

As the first gear has been engaged, the clutch causes the vehicle to start and the pump $P_1$ of the output shaft is put into operation.

3. Automatic gear shifting

If the accelerator pedal is further depressed, the pressure rises in the duct 29 since the restriction produced by the throttle valve 31, or the like, prevents a free flow to the tank R. As a result of the pressure rise, the piston 20 begins to move from left to right against the spring 37. When the vehicle velocity is high enough, the groove 35 comes into register with the orifice 22 corresponding to second gear. Pressure liquid flowing through the inner bore 34 of the piston 20 lifts the valve ball 38 against the spring 39 to flow through the groove 35 and the orifice 22. The slide piston 2 is moved against its spring load and the main circuit 94 is thus cut. As a result, the pressure rises in the ducts 87, 12 and the piston of the servomotor 10 is pushed, releasing the clutch before the gear shifting which will now take place.

The slide piston 2 having put the groove 47 in communication with the orifice 2a (Fig. 7), the latter is reached by the pressure liquid from the servomotor through the duct 11. Said pressure opens the valves 180, 181, so that it is transmitted both through the duct 165 and the duct 158 to the orifices 124 (Fig. 3) and 116 (Fig. 4), thus producing the two operating pin motions (translation and rotation) to change gear as required. The pressure fed through 116 causes the pistons 108 and 110 to move towards the right until the right-hand orifice 107 is uncovered, so that the pressure is transmitted through the duct 167 and the orifice 168 to the valve 88, causing the piston 89 thereof to move downwards to close the main circuit 87—94 and open the secondary circuit 93—95. Said secondary circuit being open, the fact that the accelerator pedal is depressed and the piston 54 in the upper position (owing to the pressure fed through the orifice 175), so that the circuit 140, 151 is open to the tank R, causes the pressure to drop in the ducts 87 and 12; the clutch is thus re-engaged.

If the accelerator pedal remains depressed and the velocity of the vehicle increases further, the shift to 3rd gear and then to 4th gear will take place automatically in the same manner. The shift to a higher gear is operated similarly if the velocity of the vehicle decreases.

4. Braking

With the apparatus above described, braking is applied by merely releasing the accelerator pedal.

It will be appreciated that the orifice 60 is closed while the vehicle is moving owing to the displacement of the rod 56 in the direction of the arrow $f$ (Fig. 8). If however, the rod 56 is released, said orifice 60 opens (more or less rapidly according to the speed of actuation) and the piston 50 begins to close the orifice 57a. A point will be reached where said orifice 57a is closed by the piston to a degree sufficient for causing the pressure to rise in the circuits 140, 142 and initiate braking. If the accelerator pedal is released abruptly, the orifice 57a closes instantaneously and the brakes are fully blocked.

5. Reverse gear

For reversing the gear, the slide piston 6 has just to be pulled. The same operations take place as described for the first gear engagement. The pressure liquid from the orifice 81 is fed through the hole 6a. From the hole 6a, the pressure is transmitted through the duct 164 to the orifice 125 (Fig. 3) and through the orifice 157 and the duct 158 to the orifice 116 (Fig. 4).

It may now be seen that the vehicle equipped with the above described apparatus is driven with the aid of only a forward and a reverse motion control members, and a single accelerator pedal for speed changing and braking. The driving is thus greatly simplified.

It will be noted however that if it is desired to keep the brake control independent from the accelerator pedal, it is only necessary to obturate the orifice 60, the operation remaining in other respects unchanged.

According to an alternative embodiment of this control apparatus, the speed selector is combined with a centrifugal clutch of any conventional and suitable type just substituted for the ordinary clutch operated by the servomotor 10. Such a centrifugal clutch is known in the art and does not need to be illustrated in the drawings. This centrifugal clutch is automatically released when the engine speed is lower than a predetermined value, for example 500 r.p.m.

In this case, the apparatus illustrated in Fig. 8 is no more needed and may be dispensed with except if the automatic braking by the accelerator pedal is required, and even then it may be simplified. All other parts remain unchanged as they are described above. The outlet 84 of the speed selector unit and the outlet 93 of the valve 88 are then connected directly to the liquid storage tank R. The operation is in this case as follows:

When the device is in the neutral gear condition, all the pistons 1 to 6 being in the position illustrated in Fig. 1, and the engine is idling, the liquid flows in the circuit 87, 84, 94 and back to the storage tank R without being put under pressure. The centrifugal clutch is released.

When the forward motion control lever, connected to the piston 1, is actuated, the circuit 82—84—94 is cut; the pressure rises in the duct 12 and the clutch is kept in the released condition.

If, by the accelerator pedal being depressed, the engine speed increases above a predetermined value, the centrifugal clutch operates and the vehicle is started.

As, increasing further, the engine speed reaches the value for shifting from 1st to 2d gear, this change is operated automatically in the way described above, which is not modified by the provision of the centrifugal clutch.

Experience has however shown that, with the above described device, a jerk may occur in operation if the pressure supplied by the engine-driven pump is abruptly released.

In order to avoid such a drawback, there is provided at the inlet of the duct 12 into the servomotor, or in said duct 12 upstream of the servomotor, an automatic valve or the like adapted to open widely for the inlet into the servomotor and to leave only a restricted passage for the liquid in the opposite direction.

Figure 12:
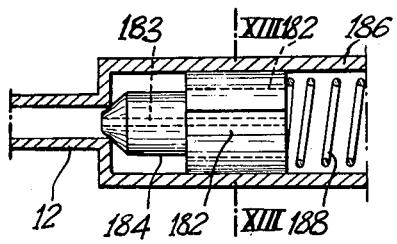
Fig. 12 is a partial section similar to Fig. 11 of another embodiment.
Figure 13:
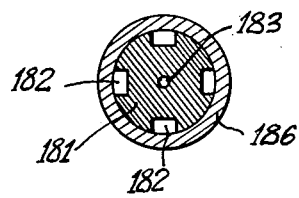
Fig. 13 is a cross-section on the line XIII—XIII of Fig. 12.

In the embodiment illustrated in Figs. 11 to 13, the movable valve member of said automatic valve is provided, on the one hand, with guiding means so that it will move correctly in the axial direction and, on the other hand, with a permanently open bore permitting, when the valve is closed, a restricted flow of liquid.

In the example illustrated in Fig. 11, the conical portion 187 of said valve member has a cylindrical extension which slides as a piston in the valve cylinder 186 and wherein are formed, on the one hand, grooves 182 for the flow of the liquid to the servomotor and, on the other hand, a bore 183 for the slow return flow of the liquid when the valve is closed.

The example illustrated in Fig. 12 is similar, with the sole difference that, between the conical portion and the guiding portion of the valve member, is interposed a cylindrical portion 184.

Thus, if the duct 12 is under pressure, the valve opens against the spring 188 and the liquid flows rapidly to the servomotor through the grooves 182 of large cross-sectional area. If the pressure is abruptly released from the duct 12, the valve is closed instantaneously by the spring 188, but a small rate of return flow of the liquid is allowed by the permanently open restricted orifice 183.

It is to be noted that this particular embodiment of an automatic valve with restricted return flow may be replaced by any other equivalent one.

In the embodiments described above, it has been assumed for simplifying the explanation that the restrictor 31 is fixedly set. Actually, however, the restriction will be preferably adjustable, either manually by the driver or automatically according to a law of variation different from that of the pressure variation in the circuit fed by the first pump (driven by the output shaft); in particular, the degree of restriction may be adjustable in relation with the control of the engine power, for example by means of a linkage between the accelerator pedal and a lever controlling the restrictor member.

In the example illustrated in Fig. 14, the piping 29—30 leading to the pump P₁ driven from the output shaft, to the speed selector 46 and to the liquid storage tank R comprises, between said selector and said tank, as in Fig. 2, a device 31 for producing a suitable pressure drop, said device comprising a rotary valve member 232 provided with an operating lever 233. Said operating lever is movable between two extreme positions which are adjustable by means of stop screws 234, 235. The end of the lever 233 is connected to the accelerator pedal through a linkage system 237, said pedal being in turn connected to the engine throttle valve 241 by a conventional linkage 240, 242 or like means.

Thus, whenever the accelerator pedal 236 is depressed, both the engine power and the opening of the valve 232 are increased at the same time, so that the gear changing will occur at higher speeds of the output shaft. Consequently, if the driver wishes to speed up rapidly, he will be enabled to do it by fully depressing the accelerator pedal.

It will be appreciated that, by suitably choosing the position of the stops 234, 235, the length of the connecting rod 237 (conveniently connected to the operating lever 233 by an adjustable engagement through a spring 243), and the initial position and the shape of the valve member 232, the conditions in which the driver can obtain a more or less rapid change of gear by means of the device designed as illustrated in Figs. 1 to 13 may be varied.

Such variation may alternatively be controlled according to the depression in the engine section piping.

For avoiding jerks when shifting gears, as may result from a race of the engine, the accelerator pedal being depressed and the clutch automatically released, there may be provided a yielding member 250 in the linkage connecting the pedal 236 to the throttle valve 241, and a piston 251 having its rod 252 connected to the throttle operating member, the cylinder 253 of the piston 251 being hydraulically connected to the clutch servomotor 10 at the same point as the duct 12. In that way, the pressure fluid causes both the clutch release and an at least partial closure of the throttle 241, thus avoiding a momentary racing of the engine.

Similarly, if an electromagnetic powder clutch is used, instead of a conventional friction clutch, the clutch servomotor 10, which may be replaced by a simple manometric capsule, could control a switch to close or cut off the circuit of the inductor means of said electromagnetic clutch.

What I claim is:

1. In a vehicle comprising an engine, a change speed mechanism for operating a conventional clutch actuated by a shift lever and for actuation of the clutch at each shift and an automatic hydraulic control for the change speed mechanism: said change speed mechanism comprising a gear box including mechanical control means, an output shaft and a control pin operatively associated with said mechanical control means and movable in two intersecting directions; said automatic hydraulic control including a hydraulic circuit hydraulically coupled to said mechanical control means for imparting control movements to said pin for movement thereof in said two directions, a hydraulic mechanism operative in response to fluid pressure in said hydraulic circuit and coupled to said pin, a plurality of hydraulic paths for selectively controlling said hydraulic mechanism and coupled to said clutch for the simultaneous control thereof together with said hydraulic mechanical control means, a distributor comprising a plurality of supply valves for selectively supplying pressure to said hydraulic paths, a first pump coupled to the engine and driven thereby for supplying the hydraulic pressure to said mechanical control means through the intermediation of said distributor and said hydraulic paths for controlling the movements of said pin, the rate of delivery of said first pump being independent of the speed of the gear box output shaft, a second pump independent of said first pump coupled to and driven by the output shaft of the gear box and delivering a supply of hydraulic fluid in a path which is independent from the supply from said first pump at a rate depending upon the speed of rotation of said output shaft, a storage tank for supply of hydraulic fluid to said first and second pumps and for receiving the return paths of the hydraulic fluid to form a closed fluid system, a restrictor coupled between said second pump and said storage tank for the return of delivered hydraulic fluid to said tank, the restrictor causing a variable back pressure which is a function of the rate of flow of the hydraulic fluid and thus of the output shaft speed and a hydraulic selector coupled to said distributor and said restrictor for selectively actuating said supply valves and comprising a cylinder, a piston movably disposed therein and movable axially relative thereto, a compression spring coupled to one face of said piston and a hydraulic path coupling hydraulic fluid to the other face of said piston for movement thereof in opposition to said spring for controlling the action of said distributor on the gear box in response to the variable back pressure produced by said restrictor.

2. In a vehicle as claimed in claim 1, comprising a fluid circuit coupled to the first pump and including valve slides forming part of said supply valves coupled to and controlled by the selector to cause the circuit to be closed and thus effect a pressure rise adapted for releasing the clutch for gear changing, and a further circuit independent of the slides and adapted to release the clutch with the associated vehicle at rest.

3. In a vehicle as claimed in claim 1, comprising valve slides coupled to and controlling the supply of pressure fluid delivered by said second pump to the distributor, said distributor including cylinders each containing a slide piston coupled to and adapted to open and close the first said circuit whereby this circuit is controlled by said slide pistons to release the clutch.

4. In a vehicle as claimed in claim 3, wherein the distributor comprises a pipe system extending from the cylinders, comprising slidable pusher pistons coupled to the pin of the gear box for controlling said pin, and a device for controlling the rotary movements of said pin with respect to the movement of said pusher pistons.

5. In a vehicle as claimed in claim 4, comprising control means coupled to and actuating the gear box operating pin, said control means comprising a cylinder rotatively mounted on the gear box and pistons reciprocating said cylinders.

6. In a vehicle as claimed in claim 5 wherein the control means includes a centrifugal clutch which is automatically released when the vehicle speed falls under a predetermined value.

7. In a vehicle as claimed in claim 1 comprising an automatic valve having a permanently open and restricted orifice coupled between the restrictor and tank.

8. In a vehicle as claimed in claim 1 wherein the restrictor is adjustable for varying the pressure drop.

9. In a vehicle as claimed in claim 1 comprising an accelerator pedal and a linkage system coupled between the restrictor and the accelerator pedal.

10. In a vehicle as claimed in claim 6 wherein said engine is coupled to the gear box and including a device for reducing the fuel supply to the engine when the clutch is automatically released, said device comprising a linkage including a member adapted to yield under the action of said device.

11. In a vehicle as claimed in claim 1 comprising a switch including pressure-sensitive means coupled to the second pump to operate said clutch.

12. In a vehicle as claimed in claim 1 in which said hydraulic circuit includes a main circuit comprising said first pump, a slide valve hydraulically coupled to said first pump for automatically engaging said clutch after a shifting of a gear, said supply valves and a servo motor, and a secondary circuit comprising said first pump, said slide valve and said servo motor, said secondary circuit being independent of said slide valve, said slide valve having a single inlet orifice coupled to said first pump and two outlet orifices, one of said outlet orifices being coupled in said main circuit and the other of said outlet orifices being coupled in said secondary circuit for releasing the clutch when said vehicle is stopped and for braking.

13. In a vehicle as claimed in claim 12 in which said distributor comprises a fluid path for each gear shift coupled to said supply valves, said fluid path for the neutral gear being coupled to said hydraulic circuit, and including a clutch release and brake control apparatus and a fluid path therefor for coupling to the fluid path of said neutral gear for releasing the clutch when the vehicle is stopped and for braking.

14. In a vehicle as claimed in claim 13, wherein said mechanical control means includes a slide piston coupled in said hydraulic circuit and operative in response to the application of pressure fluid from said main circuit for rotating said pin, and a pair of oppositely disposed pistons also coupled in said hydraulic circuit and operative in response to the application of pressure fluid from said main circuit for imparting translational movement to said pin, said pistons being operative to control the movement of said pin in accordance with the selective operation of any one of said supply valves in said distributor for obtaining conventional declutching and control of the engagement of each gear in accordance with the rotational and translational movement imparted to said pin.

References Cited in the file of this patent

UNITED STATES PATENTS

| | | |
|---|---|---|
| 2,479,183 | Petersen | Aug. 16, 1946 |
| 2,604,197 | Livermore | July 22, 1952 |
| 2,693,711 | Kelbel | Nov. 9, 1954 |
| 2,737,824 | Livermore | Mar. 13, 1956 |